Figure 1:
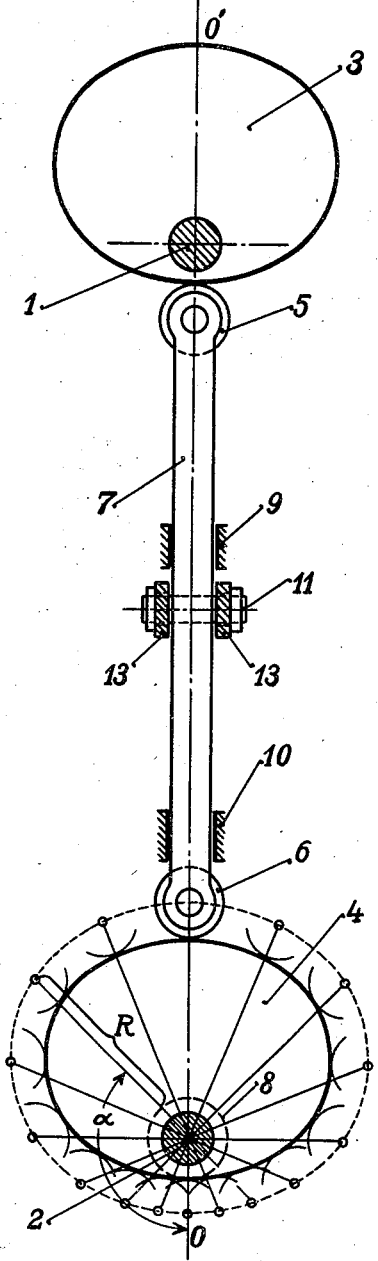

Aug. 26, 1941.    P. CICIN    2,254,195

STEPLESS MECHANICAL TORQUE CONVERTER

Filed Aug. 23, 1939    9 Sheets—Sheet 1

INVENTOR
PAUL CICIN

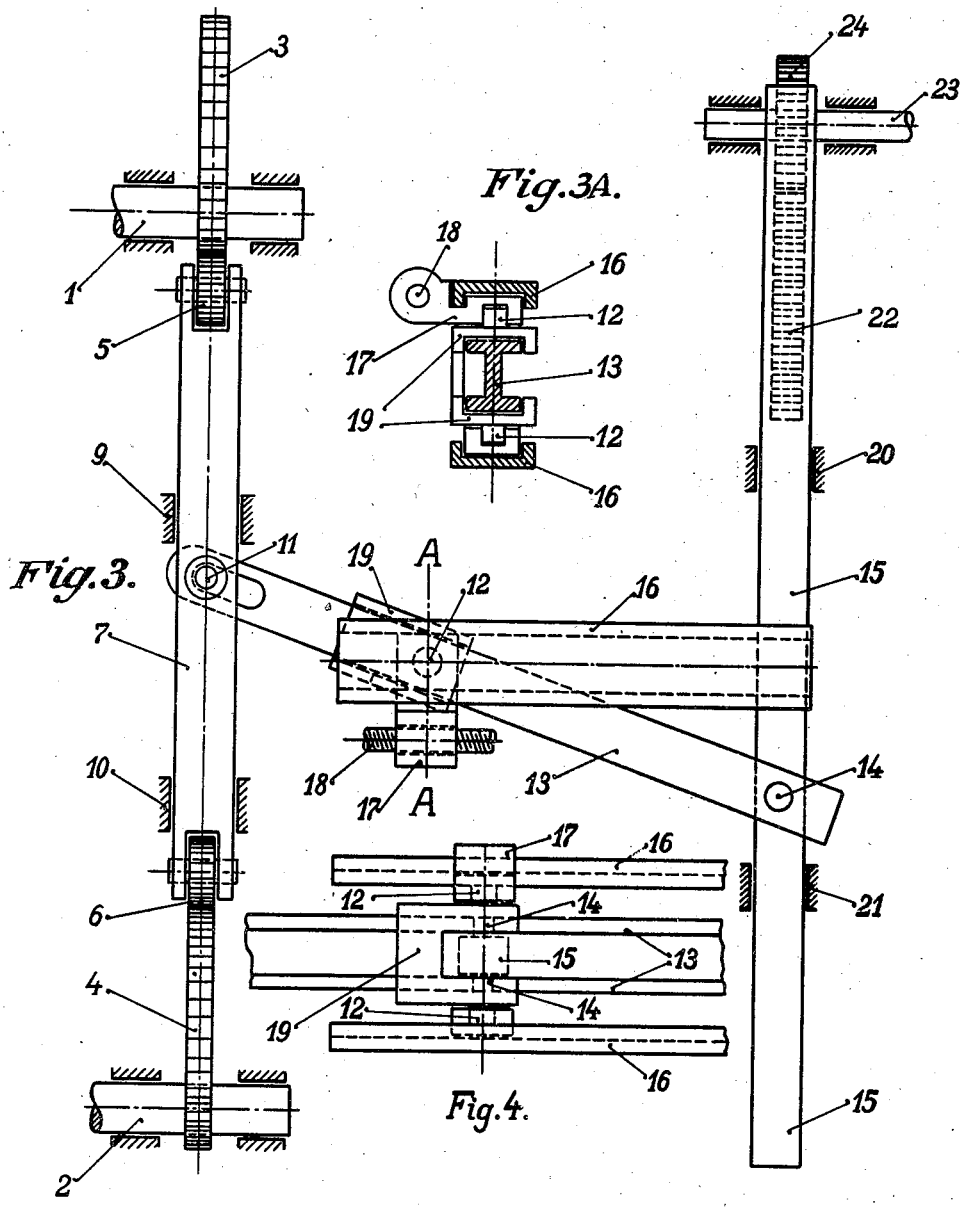

Aug. 26, 1941.　　　　P. CICIN　　　　2,254,195
STEPLESS MECHANICAL TORQUE CONVERTER
Filed Aug. 23, 1939　　　9 Sheets-Sheet 3
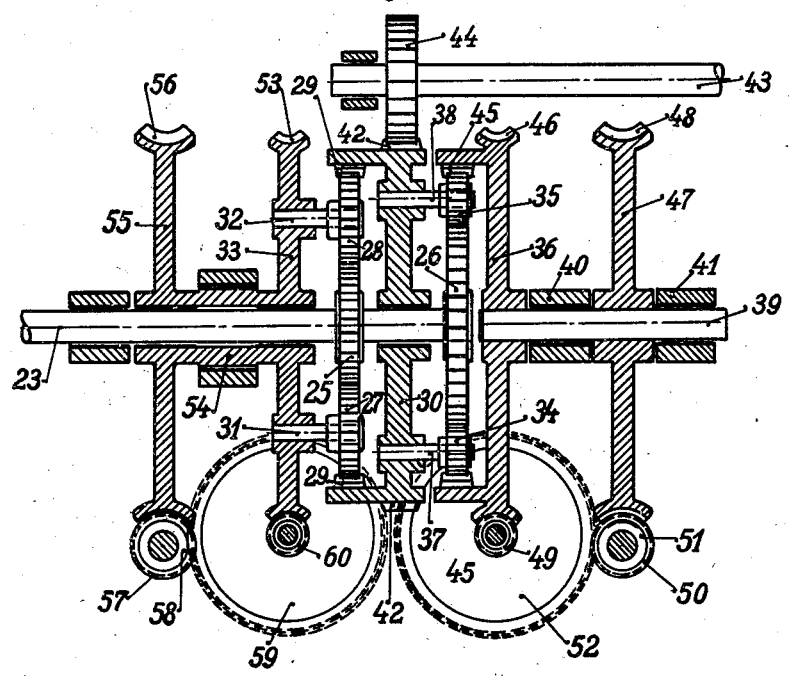
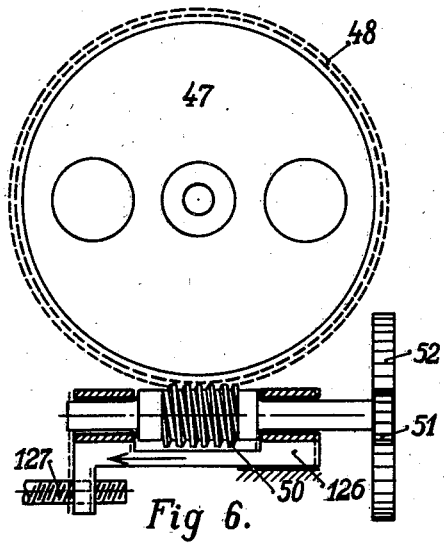
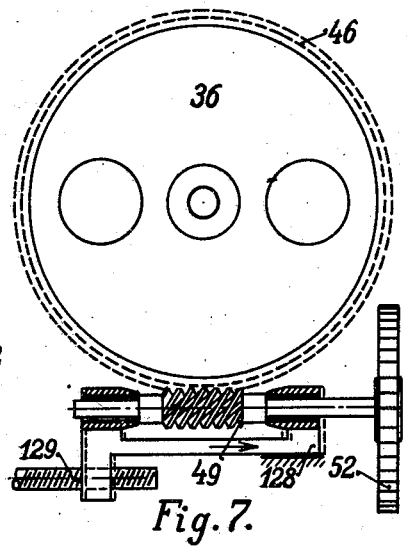
INVENTOR
PAUL CICIN

INVENTOR
PAUL CICIN.

Aug. 26, 1941.   P. CICIN   2,254,195
STEPLESS MECHANICAL TORQUE CONVERTER
Filed Aug. 23, 1939   9 Sheets-Sheet 5

INVENTOR
PAUL CICIN

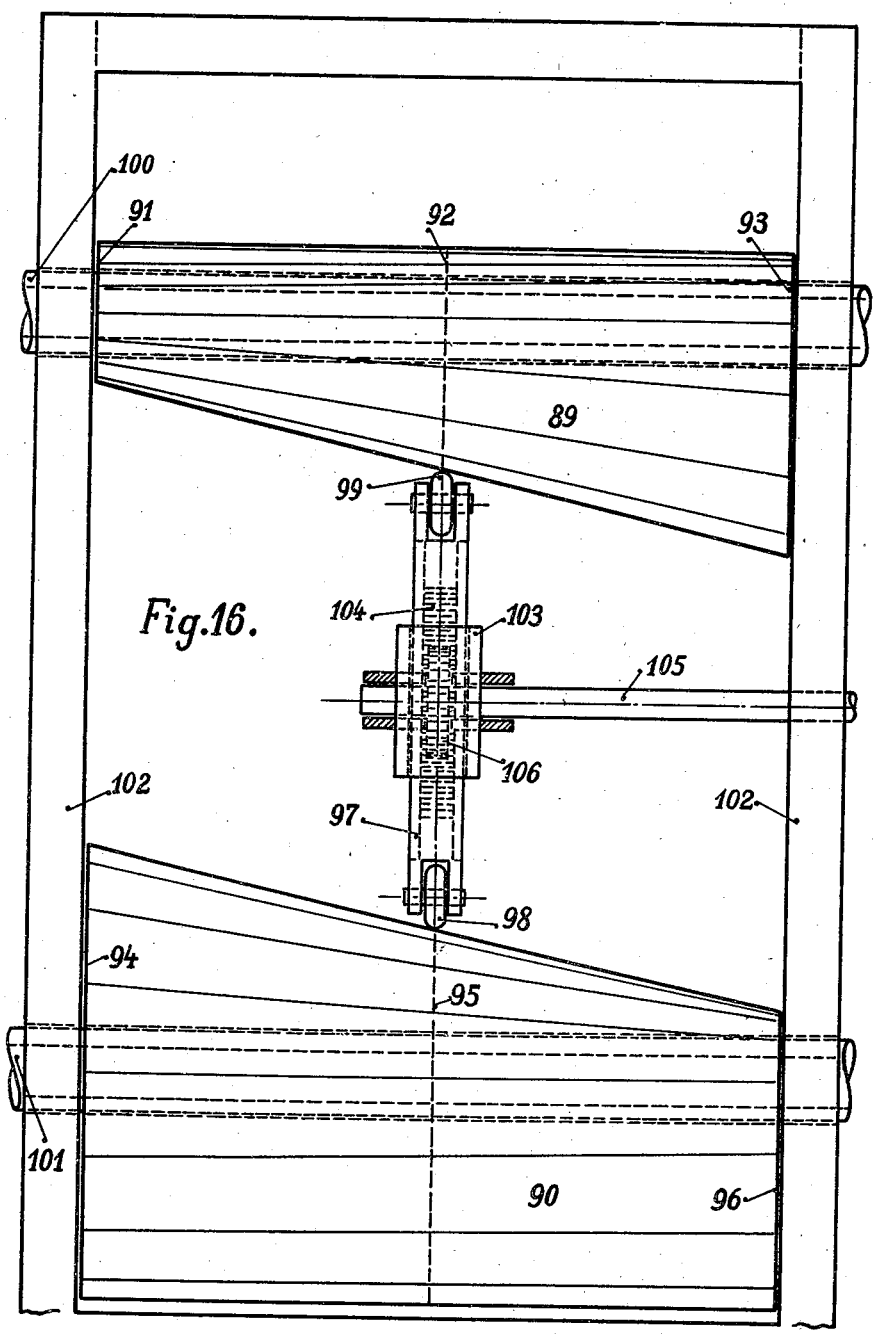

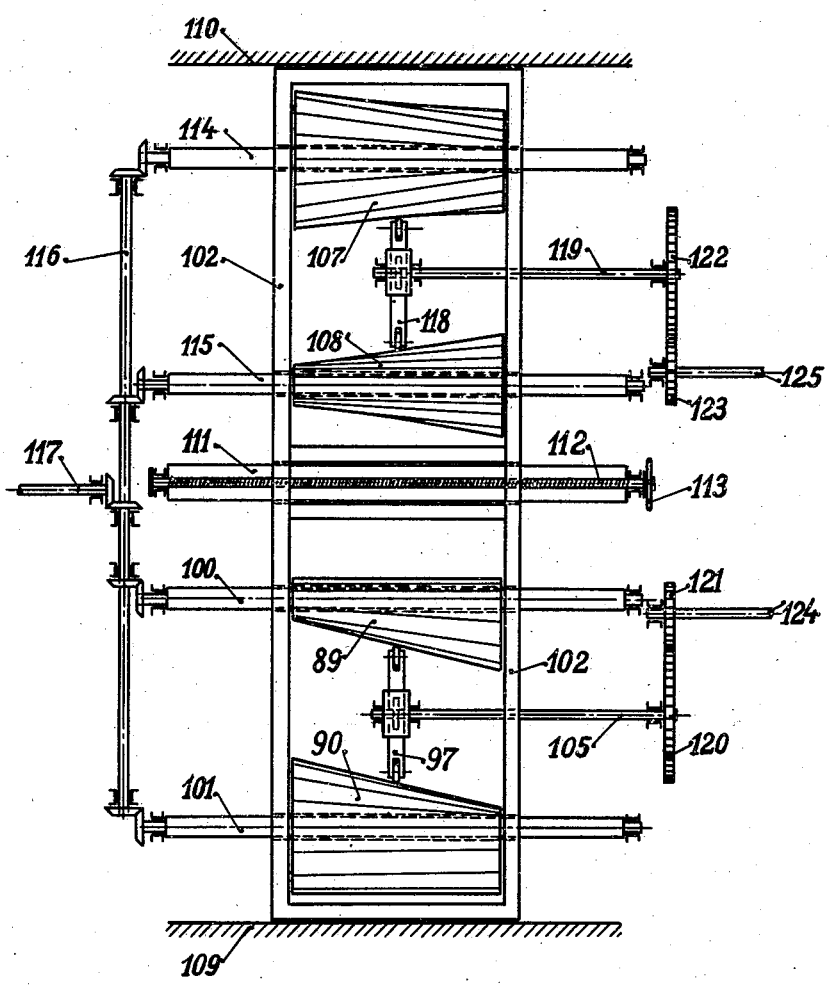

Patented Aug. 26, 1941

2,254,195

UNITED STATES PATENT OFFICE 2,254,195

STEPLESS MECHANICAL TORQUE CONVERTER

Paul Cicin, Vienna, Germany

Application August 23, 1939, Serial No. 291,602
In Germany September 5, 1938

7 Claims. (Cl. 74—119)

This invention relates to a converter for converting torque of rotating motion into linear movement and for converting rotating motion of one speed into rotating motion of another speed.

Essentially, two groups of mechanical torque or revolution converters of rotating motion, adjustable without steps, are known, of which one utilizes friction, whereas to the other one belong the so-called barring gears, where a uniform driving rotation is converted into adjustable oscillatory or reciprocating movements, from which, by means of freewheel ratchets, a drive-off rotation is produced. The former type of gear lends itself only to the transmission of small quantities of power, whereas the so-called barring gears while capable of transmitting greater power are of limited applicability also. Besides, there is one fundamental deficiency in the barring gears, inasmuch as the freewheel ratchet gear transmits to the drive-off shaft not a uniform drive-off moment, but rotational force impulses which are converted into a practically uniform rotation only by the fly-wheel effect of the driven masses.

The invention set forth below consists in the provision of a stepless mechanical torque or revolution converter, by which the uniform driving rotation will be converted, without shocks and without recourse to compensating flywheel masses, into an identically uniform drive-off rotation with any number of revolutions whatever, both theoretically and practically without loss—avoiding the usual frictional losses in bearings and gear wheels.

The invention provides the following procedure to attain this end: The driving rotation is first converted into two turning motions and then each of these into a linear reciprocating movement of such kind that at any moment the speed of the part linearly reciprocating to and fro will, respectively, neglecting the direction as represented by the sign, be proportional to the $\sin^2$ or $\cos^2$ of the respective angle of the uniform driving rotation movement. Furthermore it will be possible to impart a variable amplitude to the linear reciprocating movements, from a maximum value down to zero. The linear reciprocating movements of this variable amplitude are then converted into rotating oscillations that likewise obey the $\sin^2$ or $\cos^2$ law as far as speed is concerned, and it is obvious that these rotating movements or oscillations, in accordance with the goniometric formula: $K. \sin^2\alpha + K. \cos^2\alpha = K$ ($K$ being a value depending on the oscillation amplitude, $\alpha$ the polar angle of rotation about the axis of the driving shaft), can be converted into uniform rotation corresponding to the selected amplitude as long as the rotating oscillations take place in one direction of rotation only. Since this is not the case at first, as the rotational oscillations are successively in opposite directions on account of the reciprocating linear oscillations, it is necessary, prior to the combining of the two aforesaid rotational movements or oscillations, to rectify them, i. e. to convert them to a single unchanging direction of rotation. When this is attained, the two parts performing the rotating oscillations have always the same direction of rotation and their instantaneous speeds are at any moment positive and proportional to the $\sin^2$ or $\cos^2$ of the polar or turning angle of the driving rotation.

The required rectification of the rotating oscillations is attained, according to the invention, by a double planetary reversing gear for each. The essential feature of this reversing gear is that all gear teeth remain always engaged and that the coming into operation of one part of the double gear, due to the automatic locking of one of its members takes place for a definite direction of rotation, whereas the other part runs light and transmits no torque and thus no power during that stage of operation. Now, this locking must be realisable in any position desired, actuable by the strokes, adjustable as desired, of the linear oscillations, and this only in one direction, whereas rotation in the other direction must take place at a high mechanical efficiency. This locking, according to the intent of the present invention, is so accomplished that to either half of each of the two reversing gears there is connected a device consisting of two worm wheels with their worms, one worm of which has so small an angle of inclination of the thread as to be self-locking in all circumstances, whereas, on the other hand, the other worm has as great an angle of inclination of the thread as possible for the purpose of obtaining a high efficiency. The teeth of the worm wheels are in contact with the worms at one side only, that is in the opposite directions of rotation, and have, in the other direction, an essential side play so that with one direction of rotation one worm enters into action and with the other direction of rotation the other worm enters into action. The two worms are interconnected by a gear. The locking action is accomplished in such a way that in the respective direction of rotation one worm wheel bears against the self-locking worm, thus becoming prevented from turning, whereas, on the other hand, no-load action becomes operative when, with the opposite direction of rotation, the second worm wheel actuates the non-self-locking worm and, through the aforesaid gear, actuates also the self-locking worm. The rotational oscillations thus rectified and, as to their speed, proportional to the $\sin^2$ or $\cos^2$ of the polar angle of rotation about the axes of the driving shaft, are now united in a common differential gear in such a way that a uniform rotation will be derived from it. In connection with the conversion of the uniform driving rotation into a $\sin^2$ and $\cos^2$ linear reciprocating movement of adjustable amplitude it is further pointed out that, according to the course of the time-speed curves, both the acceleration and retardation process have a very favorable development and therefore permit of high speeds of revolution being attained, without excessive inertia forces or even shocks occurring.

Figures 1 to 17 show two practical examples of the invention.

Figure 2:
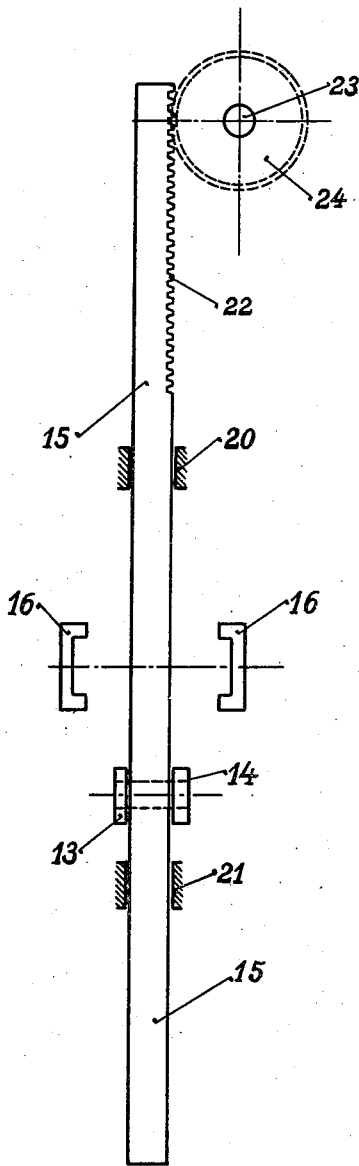
Figure 8:
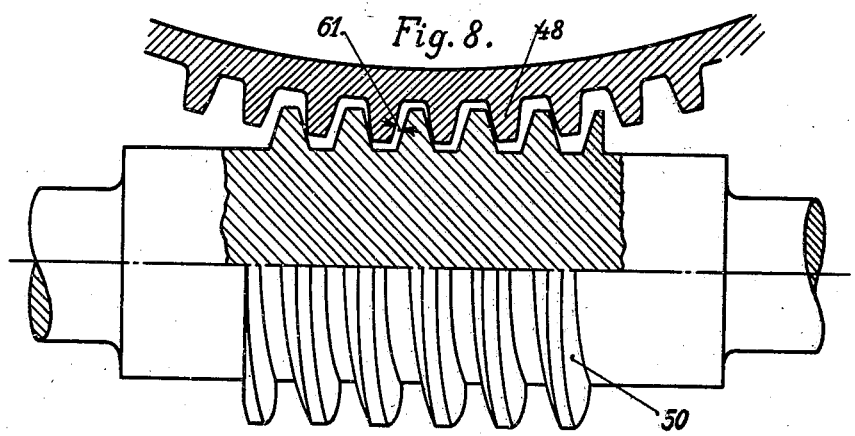
Figure 9:
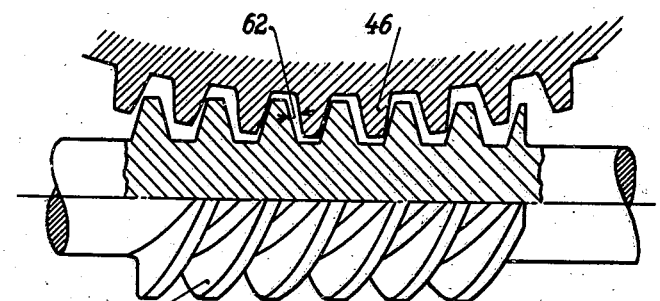
Figures 10, 11:
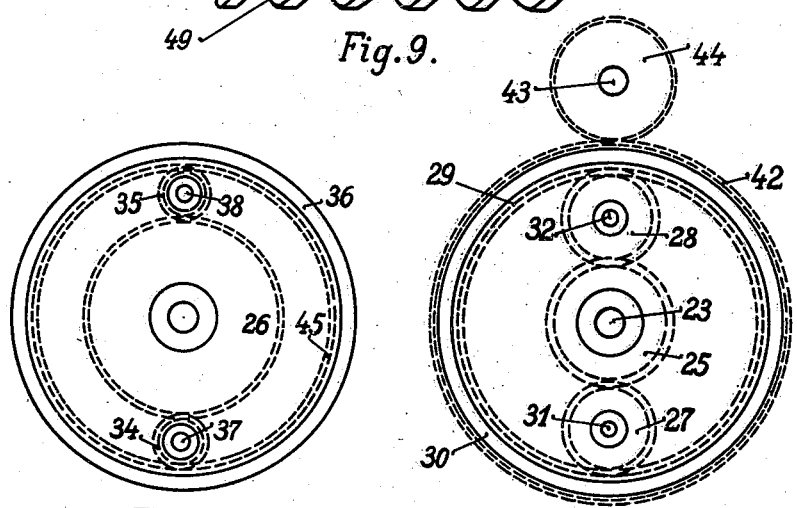
Figure 14:
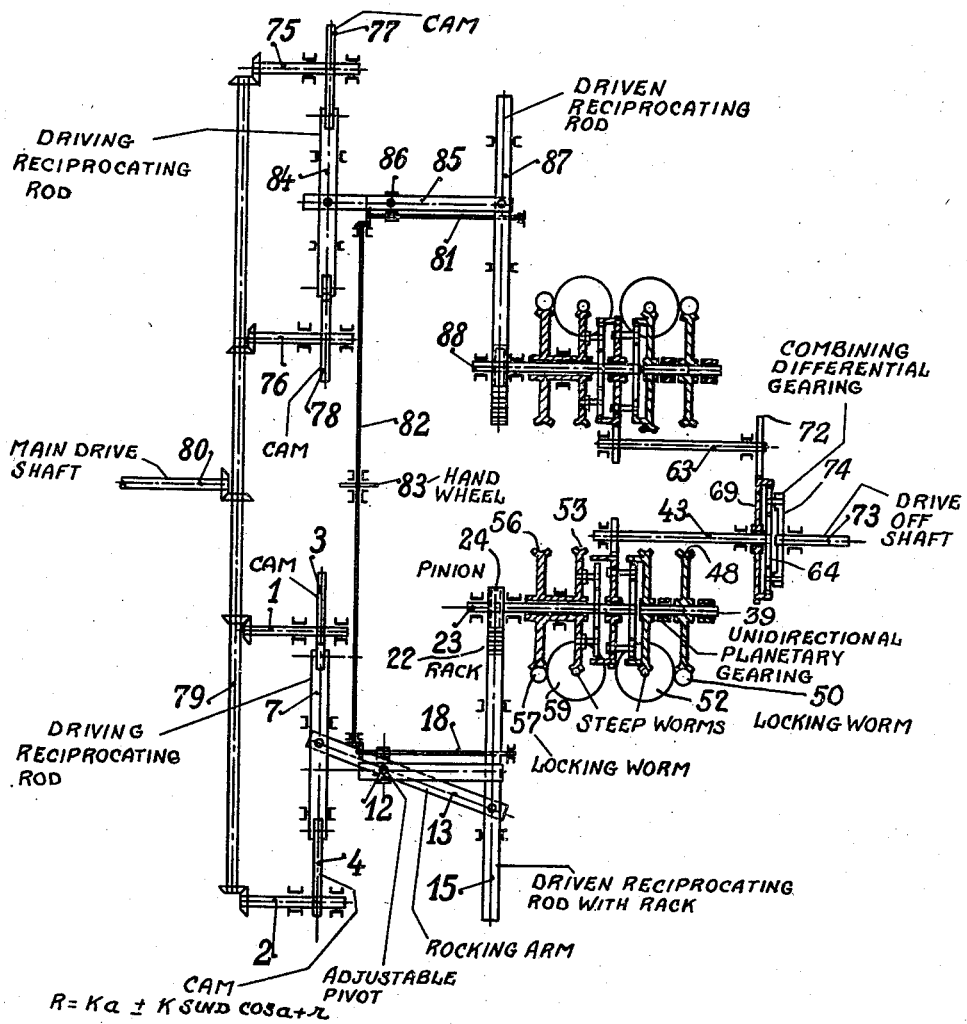
Figures 15, 15A:
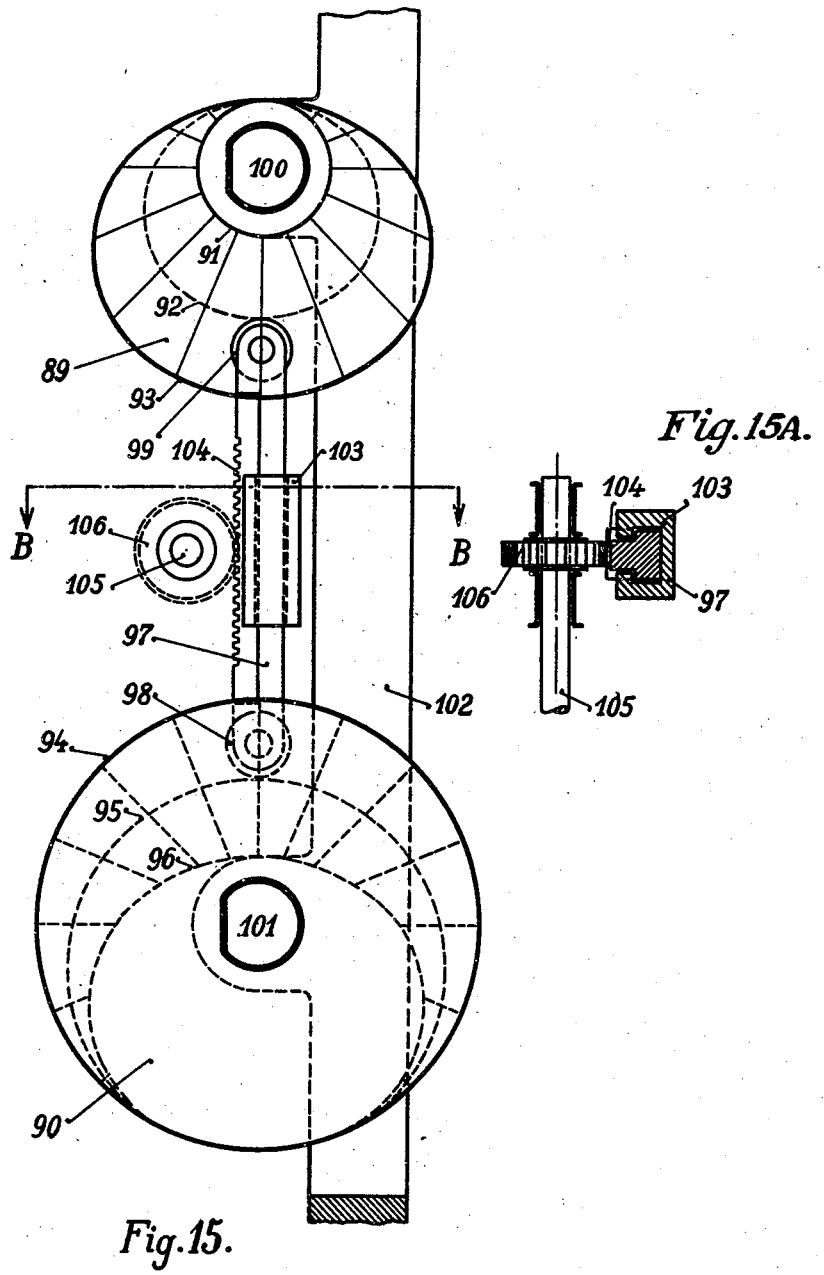

Fig. 1 shows the device, by which the uniform driving rotation is converted into linear reciprocating movements. Figs. 3 and 4 represent how the amplitude of the original movement changes; Fig. 3—A is a transverse section taken on line A—A of Fig. 3; Fig. 2 shows the conversion of these linear movements into rotational oscillations. In Figures 5 to 11, one of the rectifiers to have both rotations in the same direction is shown both in its general arrangement and in its details, whereas in Figs. 12 and 13 the differential gear which effects the combination of the two rotational oscillations into a uniform drive-off rotation, is represented. Fig. 14 shows the general arrangement of the converter. Finally, Figs. 15, 16 and 17 show another practical embodiment of the invention, by means of which the linear oscillations performed at a speed proportional to the $\sin^2$ or $\cos^2$ of the angle of rotation of the driving shaft, are produced. Figs. 15 and 16, in particular, show the details of the design, whereas Fig. 17 represents the general arrangement for resolving the rotating motion into the two partial oscillations. Fig. 15—A is a transverse section taken on line B—B of Fig. 15.

Referring to the figures in detail, Fig. 1 shows the two cam discs 3 and 4 operated, with a uniform number of revolutions, by the driving shafts 1 and 2; the shape of cams 3 and 4 is determined from the condition that the push rod 7, which is guided in a straight line and which, through the rollers 5 and 6, is in constant contact with the two cam discs, performs linear displacements or reciprocating movements, whereas the instantaneous speed of rod 7 must always be proportional to the square of the sine of the turning or polar angle $a$ of shafts 1 and 2 with reference to a fixed radius of origin, that is, $v = 2k \sin^2 a$ (i. e. change the right side of the equation to $2k \sin^2 a$). The time-path curve, i. e. the law of motion is, consequently, found here by integration of the speed-time equation to be $R = k \cdot a \pm k \cdot \sin a \cdot \cos a + r$, where $k$ signifies a constant; the minus applies to the $\sin^2$, the plus to the $\cos^2$ oscillation and $r$ is the radius of roller 6. When tracing out, measuring from the circumference of an assumed base circle 8 drawn about the axis of shaft 2 as center, and proceeding to either side of the radius of origin or initial direction O'—O, the radius vectors R thus found, corresponding to the respective traversed time or position of turning or polar angle of rotation between 0° and 180°, measured by the corresponding radii passing through the axis of the shaft 2, the sought shape of the cam disc results as the envelope of the circles with the radius of rollers 5 and 6, in which circles the end points of the radii are shown as centers. If radius vector R is measured from the axis of shaft 2 as a pole, the constant $r$ should be changed to $r+s$, where $s$ is the radius of base circle 8. As can be seen from Fig. 1, the shapes are identical for both the cam discs 3 and 4 which also occupy the same positions on the shafts 1 and 2. A simple reflection shows that the two other cam discs not shown in the drawings, which are to determine the speed of the other push rod in accordance with a $\cos^2$ law, have also the identical shape, with the only difference of being displaced 90° in relation to the $\sin^2$ cam discs. Push rod 7 is guided in its reciprocating linear motion by bearings 9 and 10.

The linear reciprocating movements thus produced are, at first, of the same value in amplitude. For the transformation of this amplitude there serves the device represented in Figs. 2, 3 and 4. From Fig. 3 it can be seen that the linear motion of push rod 7, by means of bolt 11, is transmitted to the rocking arm 13 pivoting round the pivot 12, which forces this arm also to make oscillatory movements, of the same kind, around the pivot 12. At its other end, the rocking arm 13 is connected, through a pivot bolt 14, with another push rod 15 which is guided in a straight line and which therefore, in its turn, performs linear reciprocations, though of an amplitude different from that of push rod 7. However, since the pivot 12 of rocking arm 13 is adjustable along a guide rail 16, the amplitude of the movements of push rod 15 can be altered to any extent and continuously. Since the center line of guide rail 16 forms two similar triangles with the center line of rocking arm 13 and with the center lines of the two push rods 7 and 15, the motion law derived from the shape of the cam discs remains intact also with the altered amplitude. The rocking arm 13 is provided, on the side of the pivot bolt 11, with a longitudinal slot, since, owing to being guided in straight lines, the distance apart of the two bolts 11 and 14 varies during motion. Bolt 12 is adjusted by the adapting piece 17 guided in rail 16, by turning the screw 18. As can be seen from Fig. 14, the screws for the two pairs of cam disks are coupled to one another. Standstill of push rod 15 occurs with continued reciprocating movement of push rod 7, when by shifting of the adapting piece 17 the axes of the two pivot bolts 12 and 14 are brought to coincidence; moreover, by shifting the fulcrum or pivot bolt 12 it is possible to create movements of larger and smaller amplitude than performed by the push rod 7. The two halves of the pivot bolt 12 are connected by the stirrup 19 which forms a guide for the rocking arm 13 thus permitting the necessary sliding motion of the rocking arm, as shown on section A—A in Fig. 3—A. As can be seen from Fig. 4, stirrup 19 is so designed as not to affect the coincidence of bolts 12 and 14. The linear motion of push rod 15 is accomplished by the guide bearings 20 and 21. Outside these bearings, push rod 15 is, on one side, provided with a toothed rack 22, with which the spur wheel 24, turning upon the shaft 23, engages, see Fig. 2. The spur wheel 24 thus takes care of the linear movements of push rod 15, converting them into rotational oscillations.

The speed of the rotational oscillations thus obtained will, at any time, be proportional to the $\sin^2$ or $\cos^2$ of the polar angle of rotation about the axis of the driving shaft, but the oscillations still have alternating direction of rotation and must be rectified to enable their being combined into a uniform rotation. This task is accomplished by the rectifier represented in Figs. 5 to 11. It consists, as mentioned above, of a double planetary gear of such design that the torque will always be transmitted from one half, whereas the other runs light. Accordingly, two sun wheels 25 and 26 are shrunk on shaft 23, Fig. 5, upon the circumference of which there runs a planetary wheel pair for each. The planetary wheels 27, 28 pertaining to the sun wheel 25 engage with the teeth 29 of the wheel 30 and are supported, through the spindles 31 and 32, on the wheel disc 33 rotatably mounted upon the shaft 23. In a similar manner the two planet wheels 34, 35 of the sun wheel 26 engage with the teeth 45 of the wheel 36 which has internal teeth, whereas their spindles 37 and 38 are supported in the wheel 36. The wheel 36 is fastened upon the shaft 39 which turns in the bearings 40 and 41 and is independent of shaft 23. The wheel 30 carries, in addition to its internal teeth 29, external teeth 42, by means of which it operates the spur wheel 44 shrunk on the shaft 43.

The rectifying effect is accomplished in the following manner: In one direction of rotation of shaft 23 it is the wheel disc 33 that is held in place, whereas the wheel 36 turns freely without resistance, while on reversal of the direction of rotation of shaft 23 the wheel 36 is prevented from turning, whereas the wheel disc 33 turns freely. By this means, at one moment the pair of axles 31, 32 of the planet wheels 27, 28 are held fast and the planet wheels enabled to transmit the torque and thus the power to the internal teeth 29 of wheel 30 and the next moment, due to the engaging internal teeth 45 of wheel 36, the transmission of the torque to wheel 30 through the spindles 37, 38 of the planet wheels 34, 35 is again made possible. As can be seen from Figs. 10 and 11, with alternating direction of rotation of shaft 23 there results an unchanging direction of rotation of wheel 30 and thus also of spur wheel 44 and shaft 43. Besides, in Figs. 5, 10 and 11, the proportions in size of the internal wheels 25, 26 and of the planet wheel pairs 27, 28 and 34, 36, are so selected that in the two directions of rotation the speed development for wheel 30 is the same. Furthermore, it can easily be seen from the figures that the reactions of spindles 31, 32 on the wheel disc 33 on the one hand and of the planet wheels 34, 35 on the internal teeth 45 on the other hand, with unchanging direction of rotation of wheel 30, are always rectified so that wheel disc 33 and wheel 36 will offer resistance in one direction only when transmitting the torque.

This operating characteristic is made use of in the devised arrangement of the locking device. This will be clear by reference to Fig. 5 and Figures 6, 7, 8 and 9, which refer to the right-hand locking device of Fig. 5. Fig. 5 shows that wheel 36 has been designed as a worm wheel with teeth 46 and that on the same shaft 39 which carries wheel 36, another worm wheel 47 with teeth 48 is shrunk on. With each of the worm wheels a worm, which is the steep-pitch, not self-locking worm 49 (here shown as quadruple-threaded worm), engages with the worm wheel 36, and the worm 50 which is flat-threaded, and under all circumstances self-locking engages with the worm wheel 47. Both worms and worm shafts respectively are interconnected by the gearing 51, 52, so that notwithstanding the different angles of pitch or inclination the two worms drive their worm wheels at the same angular speed. For the same reason ore worm has been designed left-handed and the other right-handed. Besides, in the self-locking worm 50—Fig. 8—only the right-hand faces of the teeth bear against the corresponding left-hand faces of teeth 48, whereas, on the other hand, the steep pitch worm 49, which is not self-locking (Fig. 9), bears only with the left-hand faces of its teeth against the corresponding right-hand faces of teeth 46, while the opposite faces have in the two cases a considerable play: 61 and 62 respectively.

The action is such that when torque is applied which tends to rotate wheel 36 in one sense, through the teeth 48 of the worm wheel 47, a pressure is exerted on the tooth faces of the self-locking worm 50, and the wheel 47 and thus also the wheel 36 are prevented from turning, whereas with the torque applied in the opposite sense the tooth faces 46 of wheel 36 exert a pressure on the steep-pitch worm 49, put it in motion, and operate, through the gearing 51, 52, also the self-locking worm 50 which, in consequence, looses its self-locking action for this direction of rotation.

When, by shifting the aforementioned pivot bolt 12—Fig. 3—so as to coincide with the pivot bolt 14, the no-load position is reached, the opposite rotation of shaft 45, i. e. the reverse run, can be effected by displacing the worms in their axial directions, but in opposite directions. This can be accomplished by shifting the bearing 126 of worm 50, Fig. 6, to the left as far as the dotted position through the spindle 127, and by simultaneously shifting the bearing 128 to the right, position shown dotted in Fig. 7, through the spindle 129. By means of a safety device it can easily be arranged that this transition from one direction of rotation to the other takes place only in the no-load position. The analogous arrangement as described above has been made for the left-hand half of the revolving gear, with the only difference that here the wheel disc 33 provided with the worm gear teeth 53 is connected to the second worm wheel 55 by means of a hollow shaft 54 in which the shaft 23 freely turns. With teeth 56 of worm wheel 55 there engages the self-locking worm 57, the shaft of which, by means of the spur gearing 58, 59, is connected to the shaft of the steep-pitch worm 60 engaging with the worm wheel 33. Since both for one direction of rotation and the other direction, one tooth face of a worm wheel is always in contact with the corresponding worm, and the two worm wheels are rigidly interconnected, the locking as well as the release takes place without any shock and the locking gear itself is accelerated in guided motion, and also retarded in guided motion until movement stops.

The shaft 43 transmits revolutions which develop from a speed of zero up to a maximum value and then decrease again down to zero, but now maintaining the same direction of rotation all the time. The development of the angular speed now takes place in the whole operation according to a $\sin^2$ function, since the values always remain positive. A similar rotation, but with a displacement of phases corresponding to the course of the $\cos^2$ function, is transmitted by the shaft 63 starting from the second gear half—see Fig. 14—so that the two can be combined to a uniform rotational motion, but of a number of revolutions other than that of the driving shaft, following the goniometric formula:

$$K. \sin^2 a + K. \cos^2 a = K.$$

Figure 12:
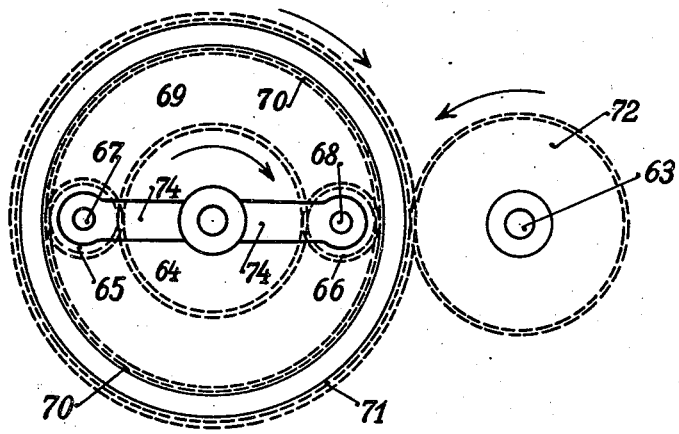
Figure 13:
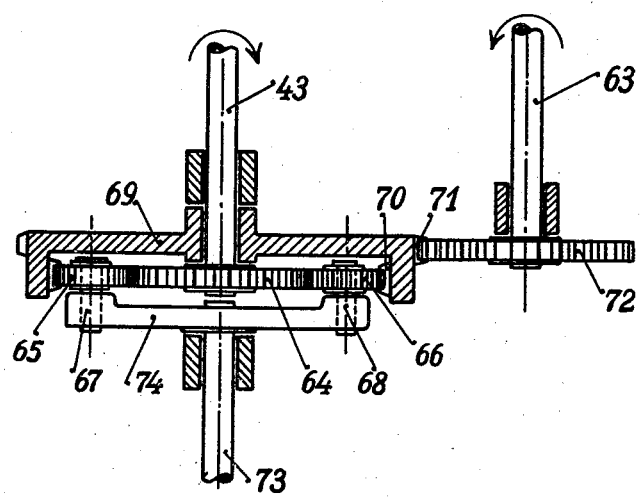

This adding of the two rotating motions takes place in the planet gear shown in Figs. 12 and 13, consisting of the sun wheel 64 shrunk on shaft 43, of the two planet wheels 65, 66 running on its periphery with the spindles 67, 68 and the wheel 69, with the internal teeth 70 of which engage the planet wheels. This wheel is, in addition, provided with external teeth 71, with which engages the spur wheel 72 fitted on shaft 63. The spindles 67, 68 of the planet wheels 65, 66 are firmly carried on a double support 74 shrunk on the drive-off shaft 73. In order that the combination of the two rotating motions in the revolving gear should produce a uniform rotation of the drive-off shaft 73, the spur wheel 72 inserted between wheel 69 and shaft 63 must bring about a slowing down in the rotation of wheel 69 in relation to the angular speed of shafts 43 and 63; this retarding factor is always smaller than unity, and, as follows from one of the known calculation methods, equal to the relation between the number of teeth of sun wheel 64 and the number of teeth of the internal toothing 70 of wheel 69. Since only one wheel is required for producing this gear ratio, the locking gear of the second gear half must be so adjusted that shaft 63 has always a direction of rotation contrary to that of shaft 43.

The uniform rotation thus obtained of the drive-off shaft 73 does not require any compensation by a fly wheel, or by fly wheel mass, etc. The uniformity of the drive-off is conditioned only by the uniformity of the drive.

Fig. 14 shows a general assembled arrangement of the whole system and also the connection of the two shaft pairs 1, 2 and 75, 76 of the curve disc or cam pairs 3, 4 and 77, 78 through the connecting shaft 79 and their drive by the main drive shaft 80. Fig. 14 represents, in addition, the connection of spindle 18, which alters the oscillation amplitudes and thus the number of revolutions, to the corresponding spindle 81 of the other gear half through shaft 82, on which latter the hand wheel 83 is shrunk. By turning this hand wheel, the pivots 12 and 86 of the rocking arms 13 and 85 respectively are shifted by means of the spindles, the amplitudes of the reciprocating linear movements of the push rods 15 and 87 altered, and thus finally the number of revolutions of the drive-off regulated as may be desired. In this figure, the first push-rod of the second gear half is marked with 84 and the shaft to the second planet gear with 88.

Figures 15, 16 and 17 represent a second embodiment of the invention, by means of which the uniform driving rotation is converted into linear reciprocating movements of varying amplitude developing according to the speed law: $K. \sin^2 \alpha$ and $K. \cos^2 \alpha$ respectively. In place of the curve discs or cams of the first example there are two pairs of cone-shaped bodies uniformly operated, the cross sections of which, perpendicular to the axis of rotation, are so designed that they cause the respective linear guided push rod situated each between a pair of conical bodies and in permanent contact with these two pairs to make reciprocating linear movements of the specified kind and of a definite amplitude. Owing to the fact that to every cross section corresponds a definite amplitude and that the cross sections without discontinuity pass into one another, the push rod can be given the reciprocating linear motion of the desired amplitude by displacing the pair of conical bodies in relation to the push rod, and thus the desired number of revolutions and torque conversion respectively can be ensured at the drive-off.

Fig. 15 shows the pair of bodies 89, 90 in lateral view each with three of the appertaining sectional curves drawn in.

In correspondence are the sectional curves: 91—94; 92—95 and 93—96; the motion of the push rod along the sectional curves 93—96 corresponds to the maximum amplitude, whereas the push rod is stopped and no-load operation begins, as soon as the push rod 97 and the rollers 98, 99 pivoting at its end are in contact with the pair of sectional curves 91—94. For the conical bodies there are employed, in addition, the generating lines of 22° 30' as being 22° 30' and it should here be pointed out, especially with regard to manufacture, that these generating lines are straight. The conical bodies can be shifted on their driving shafts 100 and 101 respectively. For the transmission of the torque between driving axle and conical body, the shafts 100 and 101 are flattened at one side and the guides in the conical bodies fitted to the cross sections of the shafts. The conical bodies are shifted by the frame 102. Fig. 15—A shows a sectional view of the linear guide 103 of push rod 97 taken on line B—B of Fig. 15. From these two figures can be seen also the toothed rack 104 of push rod 97, by means of which the linear reciprocating movements are converted into rotational oscillations of the spur wheel 106 fastened on the shaft 105.

Fig. 16 shows the pair of conical bodies with guide frame, push-rod etc. in plan. Finally, Fig. 17 shows an assembled arrangement of the two pairs of conical bodies 89, 90 and 107, 108, and of their common guiding by the frame 102, since the displacement of the two pairs must take place at the same time and always to the same extent. The frame 102 slides between the external guide rails 109 and 110 and the intermediate rail 111. The frame is shifted by spindle 112 which engages with suitable threads of the frame and is operated by the hand wheel 113. In this case also, the two pairs of driving shafts 100, 101 and 114, 115, are connected by shaft 116 operated from the main shaft 117. Shaft 105 mentioned above and the corresponding shaft 119, actuated by push rod 118, of the other gear half, operate, through the gearings 120, 121 and 122, 123, respectively, the shafts 124 and 125 respectively, which correspond to the shafts 23 and 88 of Fig. 14.

While in the second example one pair of conical bodies is required to control each push rod, only two cams or curve discs could, of course, do as well in the first example, if these are provided with grooved guides of the specified shape. Likewise, in place of the described rectifier, especially for the transmission of small torques, a free-wheel ratchet or a different rectifier might be used. Also in place of the curve discs or conical bodies a different device answering the same purpose can be employed.

Having now particularly described and ascertained the nature of my said invention, and in what manner the same is to be performed, I declare that what I claim is:

1. In a stepless mechanical torque converter for converting original uniform rotary motion of a given speed into consequent uniform rotary motion of a different speed, a rotary drive element carrying said original uniform rotary motion, linear converting means comprising a pair of units connected for and adapted to convert said original rotary motion of said rotary drive element into two independent linear reciprocating movements whose instantaneous linear speeds are respectively proportional to the sine square and cosine square of the polar angle of rotation of said rotary drive element relative to a fixed reference radius about the axis of said rotary drive element, means for varying the amplitudes of each of said linear movements, and terminal rotatable means connected and adapted for converting and combining said linear movements to produce resultant uniform rotating movement of desired speed.

2. A converter according to claim 1, said linear converting means comprising cams whose peripheries are shaped to produce said sine square and cosine square relation of the instantaneous speeds to the polar angle of rotation of said rotary drive element.

3. A converter according to claim 1, said linear converting means comprising a pair of conical bodies whose surfaces are shaped to produce said sine$^2$ and cosine$^2$ relation of the instantaneous speeds of the polar angle of rotation of said rotary drive element.

4. A converter according to claim 1, said terminal means comprising controllable planetary gears connected for converting both of said linear movements into two rotating movements both rotating in the same sense.

5. In a stepless mechanical torque converter for converting original uniform rotary motion of a given speed into consequent uniform rotary motion of a different speed, a rotary drive element carrying said original uniform rotary motion, linear converting means comprising a pair of units connected for and adapted to convert said original rotary motion of said rotary drive element into two independent linear reciprocating movements, means for varying the amplitudes of each of said linear movements, and terminal rotatable means connected and adapted for converting and combining said linear movements to produce resultant uniform rotating movement of desired speed, each of said units comprising a cam the contour of whose periphery is the curve represented in polar coordinates with the axis of said rotary drive element as a pole by the equation $R = k\alpha \pm k \sin\alpha \cos\alpha + r$, where $R$ is the radius vector and $\alpha$ is the angle between the radius vector and a fixed reference origin radius, and $r$ and $k$ are constants, and the plus sign before the second term refers to one of said units and the minus sign refers to the other of said units.

6. A converter according to claim 1, said amplitude varying means comprising a pair of linear displaceable elements connected by lever means whose fulcrum is selectively adjustable for varying the amplitude of the resultant linear movements of one of said elements with reference to the amplitude of the applied linear movements of the other of said elements.

7. A converter according to claim 1, said terminal means comprising controllable cooperating planetary gears and cooperating worm wheels and worms, one of said worms having relatively flat teeth of pitch substantially perpendicular to the axis of said worm and being self-locking, and another of said worms having teeth oblique to the axis of said worm and not being self-locking.

PAUL CICIN.